(12) United States Patent
Guo et al.

(10) Patent No.: US 12,174,083 B2
(45) Date of Patent: Dec. 24, 2024

(54) EQUIPMENT FOR SEALING-PERFORMANCE TEST

(71) Applicant: Tsinghua University, Beijing (CN)

(72) Inventors: Fei Guo, Beijing (CN); Yijie Huang, Beijing (CN); Chong Xiang, Beijing (CN); Ganlin Cheng, Beijing (CN); Shengshan Chen, Beijing (CN); Xiaohong Jia, Beijing (CN); Yuming Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 362 days.

(21) Appl. No.: 17/812,169

(22) Filed: Jul. 12, 2022

(65) Prior Publication Data

US 2023/0408371 A1 Dec. 21, 2023

(51) Int. Cl.
*G01M 13/005* (2019.01)
*G01M 3/04* (2006.01)

(52) U.S. Cl.
CPC ............ *G01M 13/005* (2013.01); *G01M 3/04* (2013.01)

(58) Field of Classification Search
CPC .... G01M 13/005; G01M 13/027; G01M 3/04; G01M 3/042; G01M 3/08; G01M 3/10; G01M 3/00
See application file for complete search history.

(56) References Cited

U.S. PATENT DOCUMENTS

| 2019/0242777 A1* | 8/2019 | Young | G01M 3/007 |
| 2022/0065732 A1* | 3/2022 | Young | G01M 3/007 |
| 2023/0194387 A1* | 6/2023 | Martin | B01L 3/502738 |
| | | | 422/68.1 |

FOREIGN PATENT DOCUMENTS

| CN | 110823467 A | 2/2020 |
| CN | 214793778 U | 11/2021 |
| CN | 114526878 A | 5/2022 |
| DE | 102010051934 A1 | 5/2012 |
| JP | 2021037591 A | 3/2021 |

\* cited by examiner

*Primary Examiner* — Suman K Nath
(74) *Attorney, Agent, or Firm* — KILPATRICK TOWNSEND & STOCKTON LLP

(57) ABSTRACT

An equipment for sealing-performance test includes a housing, a fixed mechanism and a detection part; the housing is configured to accommodate the fixed mechanism, and an abutting part is formed in the housing and is configured to abut against an outer side of a sealing ring; the fixed mechanism includes a central rod, a plurality of fixed blocks and a driving assembly, the central rod extends along a direction parallel to the axial direction of the central rod, the plurality of fixed blocks are evenly disposed along a circumferential direction of the central rod, and the driving assembly is configured to drive the plurality of fixed blocks to move along a radial direction of the central rod; a test cavity and a detection cavity are formed in the housing, the test cavity is filled with a test fluid, and is separated from the detection cavity by the sealing ring.

20 Claims, 9 Drawing Sheets

EQUIPMENT FOR SEALING-PERFORMANCE TEST

CROSS-REFERENCE TO RELATED APPLICATIONS

This application claims priority to Chinese Patent Application No. 2022106784515, filed on Jun. 16, 2022, which is hereby incorporated by reference in its entirety.

TECHNICAL FIELD

The present application relates to the field of seals, and in particular to equipment for sealing-performance test.

BACKGROUND

Seals are materials or parts that prevent fluid or solid particles from leaking from adjacent joint surfaces and prevent impurities such as dust and moisture from entering parts of machine and equipment. Sealing ring is a common seal, which is widely used in national defense, chemical, petroleum, machinery manufacturing and other industries.

Sealing performance is one of the performance indicators of the sealing ring. At present, it is necessary to use the cooperation of a variety of test equipment to test the sealing performance of the sealing ring, which leads to the complicated testing process and low testing efficiency of the sealing performance of the sealing ring.

SUMMARY

Embodiments of the present application provide an equipment for sealing-performance test to solve the problems of complicated testing process and low testing efficiency of sealing performance of sealing rings.

In an embodiment of the present application, there is provided an equipment for sealing-performance test, including a housing, a fixed mechanism and a detection part;

the housing is configured to accommodate the fixed mechanism, and an abutting part is formed in the housing, and the abutting part is configured to abut against an outer side of a sealing ring;

the fixed mechanism includes a central rod, a plurality of fixed blocks and a driving assembly, and the central rod extends along a direction parallel to an axial direction of the central rod, and the plurality of fixed blocks are evenly disposed along a circumferential direction of the central rod; the driving assembly is configured to drive the plurality of fixed blocks to move along a radial direction of the central rod, so as to make the fixed blocks abut against an inner side of the sealing ring;

when the abutting part abuts against the outer side of the sealing ring and all of the plurality of fixed blocks abut against the inner side of the sealing ring, a test cavity and a detection cavity are formed in the housing, and the test cavity and the detection cavity are disposed along the direction parallel to the axial direction of the central rod, and the test cavity is filled with a test fluid and the sealing ring is located between the test cavity and the detection cavity, so as to separate the test cavity from the detection cavity; and the detection part is configured to detect the test fluid in the detection cavity.

By adopting the above technical solutions, when the sealing performance of the sealing ring is tested by the equipment for sealing-performance test, the sealing ring is installed on outer sides of the plurality of fixed blocks, and then the driving assembly is used to drive the plurality of fixed blocks to move along the radial direction of the center rod, so that all of the plurality of fixed blocks abut against the inner side of the sealing ring, and the abutting part abuts against the outer side of the sealing ring, so the test cavity and the detection cavity can be formed in the housing. The test cavity is filled with the test fluid, and the sealing ring is located between the test cavity and the detection cavity to separate the test cavity from the detection cavity, so that the test fluid in the test cavity will not flow into the detection cavity. Therefore, when the test fluid in the detection cavity is detected by the detection part, the sealing performance of the sealing ring may be determined by means of parameters such as a concentration of the test fluid in the detection cavity, thereby solving the problems of complicated testing process and low testing efficiency of the sealing performance of the sealing ring.

It is further configured that the driving assembly includes a guide plate, a driving part and a plurality of connecting rods.

The guide plate is disposed in the housing, and the guide plate is configured to be connected with the plurality of fixed blocks, so that the plurality of fixed blocks are slidable along the radial direction of the central rod.

The driving part is sleeved on the central rod and is movable on the central rod along the direction parallel to the axial direction of the central rod.

The plurality of connecting rods are disposed in one-to-one correspondence with the plurality of fixed blocks, and first ends of the connecting rods are rotatably connected to the driving part, and second ends of the connecting rods are rotatably connected to corresponding fixed blocks.

It is further configured that the driving assembly further includes a rotating head, and the rotating head is threadedly connected to the central rod; and the driving part is connected to the rotating head and is rotatable around the direction parallel to the axial direction of the central rod.

It is further configured that a guide portion is also provided on the guide plate; and each of the fixed blocks is provided with a guide rod, and the guide rod extends along the radial direction of the central rod, and the guide rod is threaded through the guide portion and slidable along the radial direction of the central rod; a first end of the guide rod is connected to a fixed block, and a second end of the guide rod is connected to a second end of a connecting rod.

It is further configured that each of the fixed blocks is provided with a guide groove, and a plurality of guide blocks are correspondingly provided on the guide plate, and the plurality of guide blocks are respectively provided in one-to-one correspondence with a plurality of guide grooves, and the guide blocks are disposed in corresponding guide grooves.

It is further configured that the fixed mechanism further includes a plurality of retractable shock-absorbing rods, and the plurality of shock-absorbing rods are respectively disposed in one-to-one correspondence with the plurality of connecting rods, and first ends of the shock-absorbing rods are rotatably connected to corresponding connecting rods, and second ends of the shock-absorbing rods are rotatably connected to the central rod.

It is further configured that each of the shock-absorbing rods includes a first inner rod, a second inner rod, a fixed sleeve and a first elastic member; the first inner rod and the second inner rod are each threaded through the fixed sleeve, and the first inner rod is configured to be connected with corresponding one of the connecting rods, and the second inner rod is configured to be connected with the central rod.

The first elastic member is disposed between the first inner rod and the second inner rod, and both ends of the first elastic member are connected to the first inner rod and the second inner rod, respectively.

It is further configured that a connector is further disposed on the housing, and one end of the central rod passes through the connector and the connector is arranged to be rotatable around an axial direction of the central rod.

It is further configured that a connecting assembly is provided between adjacent fixed blocks, and the connecting assembly includes two connecting blocks and a second elastic member.

The two connecting blocks are respectively disposed in one-to-one correspondence with the two adjacent fixed blocks, and first ends of the connecting blocks are rotatably connected to corresponding fixed blocks, and second ends of the two connecting blocks are rotatably connected with each other.

A first end of the second elastic member is connected to one of the connecting blocks, and a second end of the second elastic member is connected to the other connecting block.

It is further configured that the housing further includes a sealing cover, and the sealing cover is disposed on and covers the plurality of fixed blocks and is connected to the abutting part.

The sealing cover, part of the abutting part, part of each of the fixed blocks and part of the sealing ring together form the detection cavity; and/or, the guide plate, part of the abutting part, part of each of the fixed blocks and part of the sealing ring together form the test cavity.

It is further configured that the sealing cover is also provided with a detection passage, and a first end of the detection passage is communicated with the detection cavity, so as to make the detection part detect the test fluid through a second end of the detection passage.

It is further configured that, taking a plane perpendicular to the direction parallel to the axial direction of the central rod as a cross section, a cross-sectional area of the abutting part gradually increases along the direction parallel to the axial direction of the central rod, or the cross-sectional area of the abutting part gradually decreases along the direction parallel to the axial direction of the central rod.

It is further configured that a high-pressure cavity is further formed in the housing, and the high-pressure cavity is communicated with the test cavity, so as to provide the test fluid into the test cavity.

It is further configured that a ventilation passage and/or an exhaust passage are provided outside the housing, a first end of the ventilation passage is communicated with the high-pressure cavity, and a second end of the ventilation passage is connected with an intake passage.

The intake passage includes an air-source bin and a control assembly, and the air-source bin is configured to provide the test fluid to the high-pressure cavity; and the control assembly is disposed between the air-source bin and the ventilation passage, and is configured to adjust test parameters of the test fluid; and the test parameters include a pressure of the test fluid and a temperature of the test fluid.

The exhaust passage includes a waste gas bin and an exhaust valve, and the waste gas bin is configured to recover the test fluid in the high-pressure cavity, and the exhaust valve is configured to control an on-off state between the waste gas bin and the high-pressure cavity.

It is further configured that a test assembly is provided on the ventilation passage, and the test assembly includes at least one of a pressure-test piece and a temperature-test piece.

The pressure-test piece is configured to detect the pressure of the test fluid, and the temperature-test piece is configured to detect the temperature of the test fluid.

BRIEF DESCRIPTION OF DRAWINGS

The accompanying drawings herein, which are incorporated in the specification and constitute a part of this specification, illustrate embodiments consistent with the present application, and serve to explain the principles of the present application together with the description.

Figure 1:
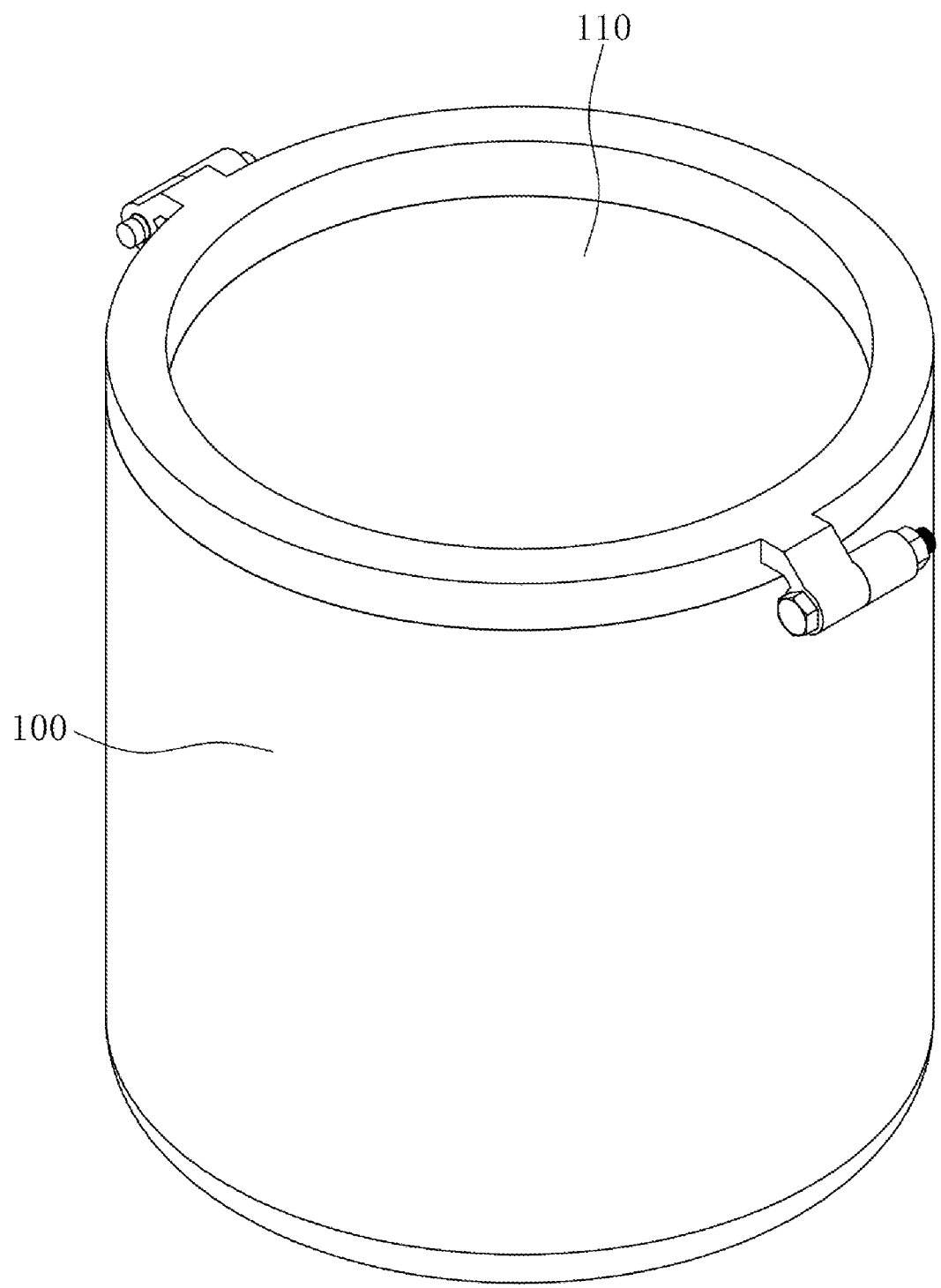
FIG. 1 is a structural schematic diagram of an equipment for sealing-performance test provided by an embodiment of the present application.

DESCRIPTION OF REFERENCE NUMBERS 100, housing; 110, top cover; 120, sealing cover; 121, installation groove; 122, installation block; 123, detection passage; 130, abutting part; 140, high-pressure cavity; 141, ventilation passage; 142, control part; 143, through hole; 150, test assembly; 151, pressure-test piece; 152, temperature-test piece; 160, connector; 161, connecting disk; 162, fixed rod; 170, test cavity; 180, detection cavity; 200, fixed mechanism; 210, driving assembly; 211, guide plate; 212, driving part; 213, connecting rod; 214, guide block; 215, guide portion; 220, shock-absorbing rod; 221, first inner rod; 222, second inner rods; 223, fixed sleeve; 224, first elastic member; 225, sealing element; 230, center rod; 231, rotating head; 240, fixed block; 241, guide groove; 242, guide rod; 250, connecting assembly; 251, connecting block; 252, second elastic member; 300, sealing ring; 400, intake passage; 410, air-source bin; 411, main intake valve; 420, pressure-control device; 421, first intake valve; 430, temperature-control device; 440, stabilization device; 450, second intake valve; 460, third intake valve; 500, exhaust passage; 510, waste gas bin; 520, exhaust valve; 600, detection part.

Specific embodiments of the present application have been shown by the above-mentioned accompanying drawings, and will be described in more detail hereinafter. These accompanying drawings and written descriptions are not intended to limit the scope of the ideas of the present application in any way, but are intended to illustrate the concepts of the present application to those skilled in the art by referring to specific embodiments.

DESCRIPTION OF EMBODIMENTS

As mentioned in the background art, good sealing performance is the most important performance requirement of the sealing ring, which plays a vital role in the normal use of the equipment. For example, in the application of a sealing ring in a high-pressure hydrogen storage container, the sealing ring has good sealing performance, which is an essential key technology to ensure the safe and reliable use of the high-pressure hydrogen storage container. The quality of the sealing performance directly affects whether the high-pressure hydrogen storage container can maintain the required internal environment, and the possibility of hydrogen leakage from the high-pressure hydrogen storage container. This in turn affects the life safety of relevant operator and the property safety of equipment.

Furthermore, considering that the sealing ring may be applied to different equipment, or applied to different positions of the same equipment, the sealing ring needs to work under different pressure conditions and different temperature conditions, which also puts forward higher requirements for the sealing performance of the sealing ring. Considering that the diameter and compression of the sealing ring are varied, and the sealing ring is required to play a sealing role within a relatively large pressure range and a wide temperature range, it is necessary to make a variety of test equipment cooperate so as to test the sealing performance of the sealing ring. However, there is currently a lack of test equipment dedicated to the sealing-performance test of the sealing ring, which makes a complicated testing process and a low testing efficiency in terms of the sealing performance of the sealing ring.

In order to solve the above technical problems, the embodiments of the present application provide an equipment for sealing-performance test, in which a plurality of fixed blocks abut against an inner side of a sealing ring, and an abutting part is abutted against an outer side of the sealing ring, so that a test cavity and a detection cavity for filling a test fluid may be formed in a housing, and the sealing ring is located between the test cavity and the detection cavity to separate the test cavity from the detection cavity, so that the test fluid in the test cavity will not flow into the detection cavity. Therefore, when the test fluid in the detection cavity is detected by use of the detection part, the sealing performance of the sealing ring may be determined by parameters such as a concentration of the test fluid in the detection cavity, and then it may be applied to the testing process of the sealing performance of the sealing rings with different sizes and compressions, which solves the problems of complicated testing process and low testing efficiency in terms of the sealing performance of the sealing ring.

Exemplary embodiments will be described in detail herein, examples of which are illustrated in the accompanying drawings. Where the following description refers to the accompanying drawings, the same numerals in different accompanying drawings refer to the same or similar elements unless otherwise indicated. The implementations described in the exemplary embodiments below are not intended to represent all implementations consistent with the present application. Rather, they are merely examples of apparatus and methods consistent with some aspects of the present application as recited in the appended claims.

The technical solutions of the present application and how the technical solutions of the present application solve the above-mentioned technical problems will be described in detail below with specific embodiments. The following specific embodiments may be combined with each other, and the same or similar concepts or processes may not be repeated in some embodiments. The embodiments of the present application will be described below with reference to the accompanying drawings.

Referring to FIG. 1 to FIG. 10, in an embodiment of the present application, an equipment for sealing-performance test is provided, including a housing 100, a fixed mechanism 200 and a detection part 600; the housing 100 is provided with an opening for accommodating the fixed mechanism 200; and an abutting part 130 is formed in the housing 100 and is configured to abut against an outer side of a seal ring 300.

Figure 6:
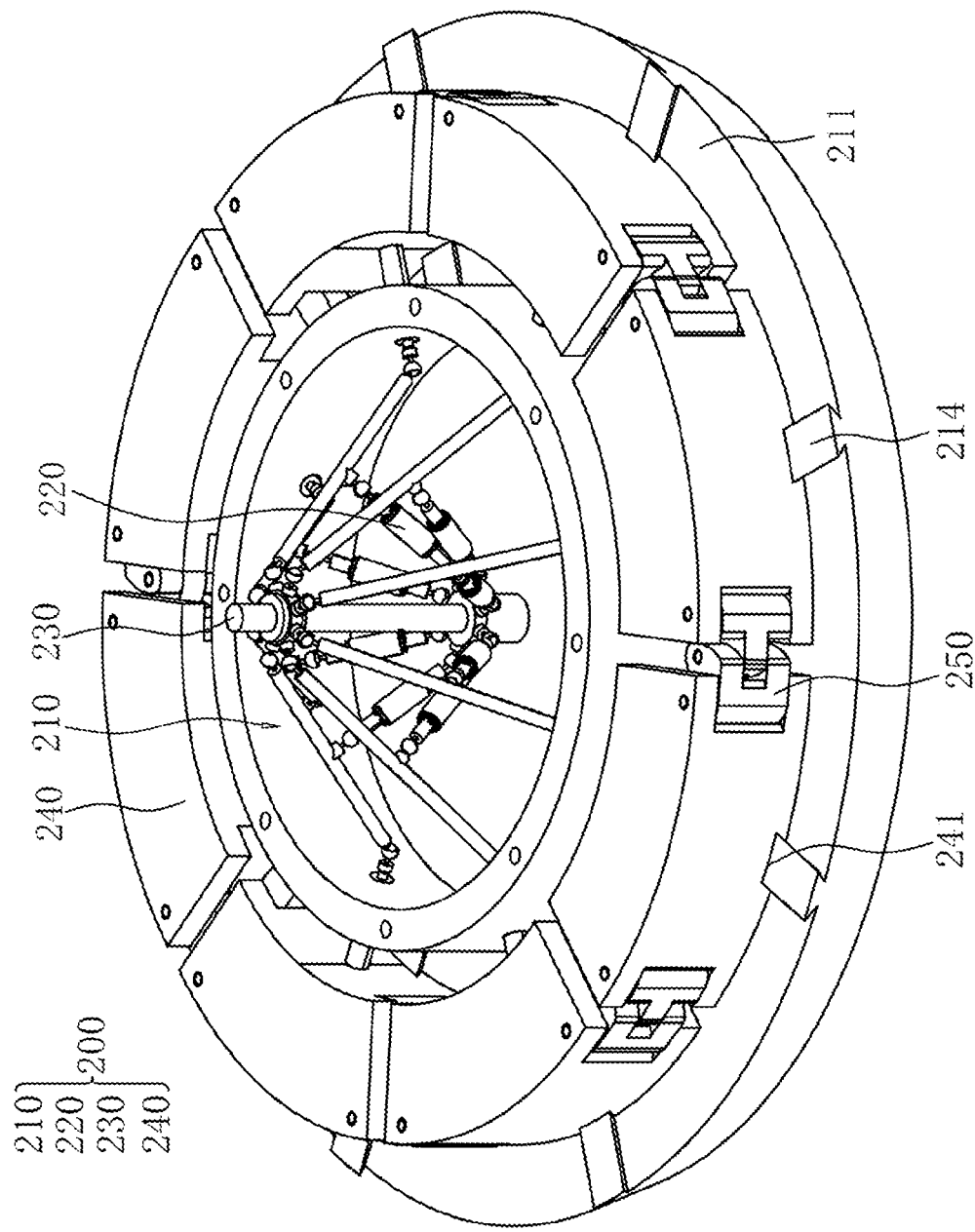
FIG. 6 is a structural schematic diagram intended to show a fixed mechanism provided by an embodiment of the present application.
Figure 7:
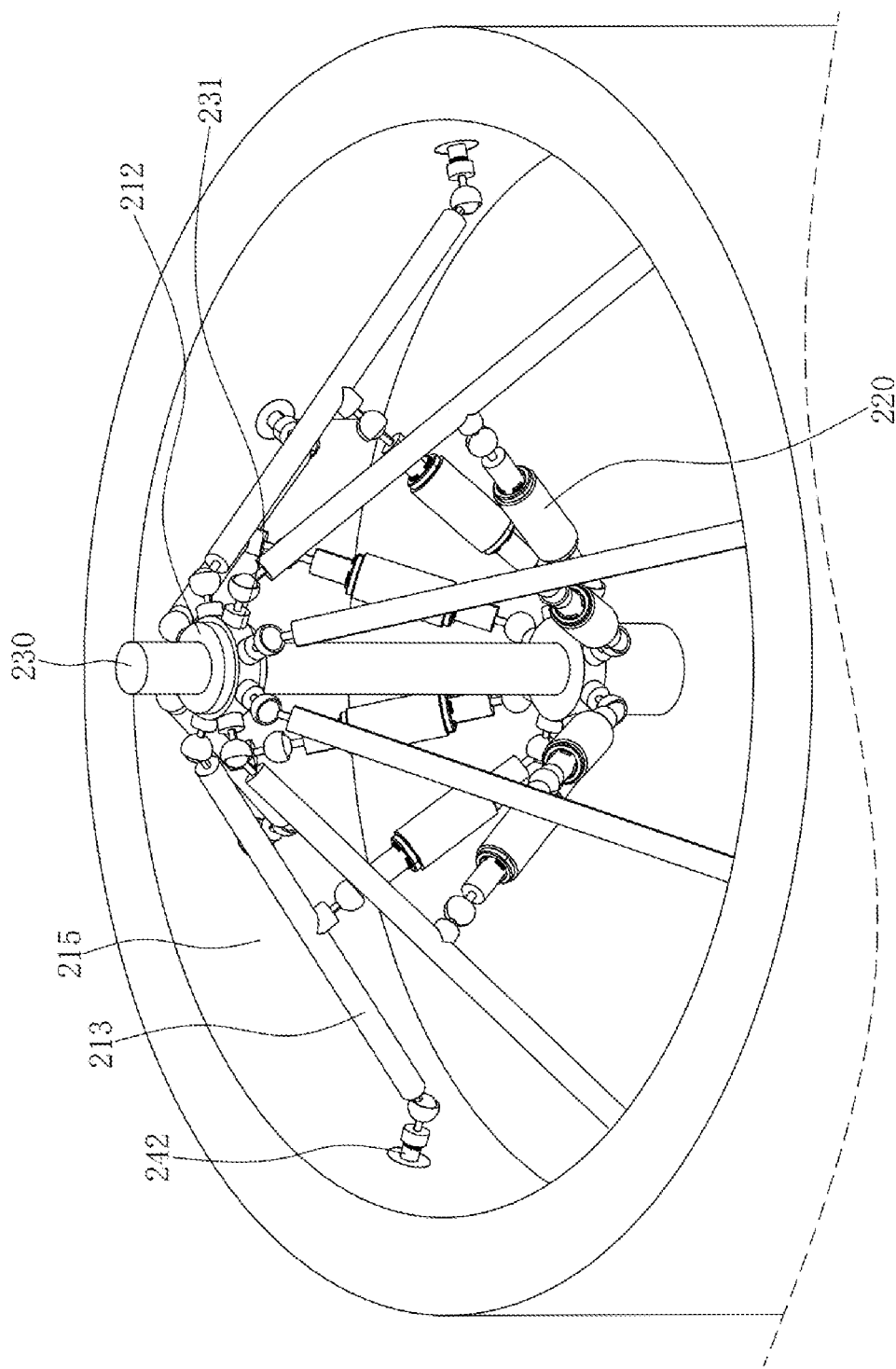
FIG. 7 is a structural schematic diagram intended to show a driving assembly provided by an embodiment of the present application.

Referring to FIG. 6 to FIG. 7, the fixed mechanism 200 includes a central rod 230, a plurality of fixed blocks 240 and a driving assembly 210. The central rod 230 extends along a direction parallel to the axial direction of the central rod 230, and the central rod 230 is disposed at the center of the abutting part 130. The plurality of fixed blocks 240 are evenly disposed on an outer side of the central rod 230 along a circumferential direction of the central rod 230; and the driving assembly 210 is configured to drive the plurality of fixed blocks 240 to move along a radial direction of the central rod 230, so that the fixed blocks 240 are abutted against an inner side of the sealing ring 300, therefore the sealing rings 300 with different diameters may be fixed by means of the plurality of fixed blocks 240 and the abutting part 130.

When the abutting part 130 abuts against an outer side of the sealing ring 300 and the plurality of fixed blocks 240 abut against the inner side of the sealing ring 300, a test cavity 170 and a detection cavity 180 are formed in the housing 100. The test cavity 170 and the detection cavity 180 are arranged along the direction parallel to the axial direction of the central rod 230, and the test cavity 170 is filled with a test fluid. The sealing ring 300 is located between the test cavity 170 and the detection cavity 180 to separate the test cavity 170 from the detection cavity 180, so that the test fluid in the test cavity 170 does not flow into the detection cavity 180. The detection part 600 is configured to detect the test fluid in the detection cavity 180, so as to detect the tightness between the test cavity 170 and the detection cavity 180.

It is easy to understand that, in the embodiments of the present application, the sealing ring 300 is an O-ring, and the equipment for sealing-performance test of the embodiments of the present application can be applied to the sealing ring 300 made of various materials, such as silicone rubber or other rubber materials with higher elasticity, or plastics, metal materials, etc. And the test fluid may be adjusted according to actual situations, that is, it may be adjusted according to the actual application scenario of the sealing ring 300. If the sealing ring 300 is configured to seal a liquid fluid and the like, the test fluid is set to be in a liquid state; if the sealing ring 300 is configured to seal a gaseous fluid and the like, the test fluid is set to be in a gaseous state. For example, when the sealing ring 300 is applied to a high-pressure hydrogen storage container, the test fluid is set to be hydrogen gas. Exemplarily, in the embodiments of the present application, the specific structure of the equipment for sealing-performance test is described by taking the test fluid hydrogen gas and the sealing ring 300 made of silicone rubber as an example.

The specific structure of the fixed mechanism 200 will be described below with reference to FIG. 1-FIG. 7. Exemplarily, the driving assembly 210 includes a guide plate 211, a driving part 212 and a plurality of connecting rods 213. The guide plate 211 is disposed in the housing 100 and an edge of the guide plate 211 abuts against the abutting part 130, and the guide plate 211 is configured to connect the plurality of fixed blocks 240, so that the plurality of fixed blocks 240 is slidable along a radial direction of the center rod 230. The driving part 212 is sleeved on the central rod 230, and is movable on the central rod 230 along the direction parallel to the axial direction of the central rod 230. The plurality of connecting rods 213 are disposed in one-to-one correspondence with the plurality of fixed blocks 240, and first ends of the connecting rods 213 are rotatably connected to the driving part 212, and second ends of the connecting rods 213 are rotatably connected to the corresponding fixed blocks 240, so that when the driving part 212 moves on the central rod 230 along the direction parallel to the axial direction of the central rod 230, the plurality of fixed blocks 240 may be driven by means of the plurality of connecting rods 213 to slide along the radial direction of the center rod 230.

By adopting the above technical solution, when the plurality of fixed blocks 240 are driven by the driving assembly 210 to slide along the radial direction of the center rod 230, so as to enable all of the plurality of fixed blocks 240 to abut against the inner side of the sealing ring 300, the driving part 212 is pulled along the direction parallel to the axial direction of the central rod 230, so as to enable the driving part 212 to drive the connecting rods 213 to rotate around the first end. Furthermore, the second ends of the connecting rods 213 rotate and drive the fixed blocks 240 to slide along the radial direction of the central rod 230, that is, along a direction close to or away from the central rod 230, consequently, all of the plurality of fixed blocks 240 can abut against the inner side of the sealing ring 300 with a different diameter, and the outer side of the sealing ring 300 may be contacted with the abutting part 130.

It is easy to understand that, in the embodiments of the present application, the shape and number of the fixed blocks 240 may be implemented in various ways. For example, the number of the fixed blocks 240 may be set to eight or ten, and a side of each of the plurality of fixed blocks 240 far away from the central rod 230 is set as an arc shape, so as to enable the side of each fixed block 240 far away from the center rod 230 to be closely fitted with the inner side of the sealing ring 300, thereby ensuring the airtightness of the detection cavity 180 and the test cavity 170.

It should be noted that there may be a hinged connection or a universal joint connection between the first end of the connecting rod 213 and the driving part 212, and between the second end of the connecting rod 213 and the fixed block 240, as long as the normal rotation of the connecting rod 213 may be ensured.

Referring to FIG. 1 to FIG. 7 continuously, in the embodiments of the present application, the center rod 230 may be disposed on the housing 100 and be rotatable around the direction parallel to the axial direction of the central rod 230, and is disposed on the guide plate 211 and passes through the guide plate 211. The driving assembly 210 further includes a rotating head 231, which is threadedly connected to the central rod 230; and the driving part 212 is connected to the rotating head 231 and is rotatable around the direction parallel to the axial direction of the central rod 230.

By adopting the above technical solution, when the driving assembly 210 is required to drive the plurality of fixed blocks 240 to slide on the guide plate 211, the center rod 230 is rotated, so that the center rod 230 may rotate on the guide plate 211 around the direction parallel to the axial direction of the central rod 230. Furthermore, the center rod 230 is threadedly connected with the rotating head 231, so that the rotating head 231 may move on the central rod 230 along the direction parallel to the axial direction of the central rod 230. The rotating head 231 is rotatably connected with the driving part 212, so that the driving part 212 may be driven to slide on the central rod 230, thereby the plurality of fixed blocks 240 may be driven to slide on the guide plate 211 by means of the driving part 212.

Referring to FIG. 6 and FIG. 7, further, in order to make the sliding process of the fixed block 240 on the guide plate 211 more stable, a guide portion 215 is also provided on the guide plate 211; and each fixed block 240 is provided with a guide rod 242. The guide rod 242 extends along the radial direction of the center rod 230; and the guide rod 242 is threaded through the guide portion 215, and is slidable along the radial direction of the center rod 230. A first end of the guide rod 242 is connected to the fixed block 240, and a second end of the guide rod 242 is connected to the second end of the connecting rod 213, so that the connecting rod 213 may be connected with the corresponding fixed block 240 via the guide rod 242.

Referring to FIG. 6 and FIG. 7 continuously, as for the specific structure of the guide portion 215, it is easy to understand that the guide portion 215 may be implemented in various ways. For example, the guide portion 215 may be set to be multiple, and multiple guide portions 215 may be disposed in one-to-one correspondence with the plurality of the connecting rods 213, so that a plurality of guide rods 242 may be threaded through the corresponding guide portions 215. Alternatively, in the embodiments of the present application, one guide portion 215 is disposed, and taking a plane perpendicular to the direction parallel to the axial direction of the central rod 230 as a cross section, a cross section of the guide portion 215 is set to be annular; and a center of the guide portion 215 coincides with that of the center rod 230, so that the plurality of guide rods 242 may be simultaneously connected via one guide portion 215.

By adopting the above technical solution, when the driving assembly 210 is utilized to drive the plurality of fixed blocks 240 to move, the central rod 230 is rotated, so that the driving part 212 may be driven to slide on the central rod 230 along the direction parallel to the axial direction of the central rod 230, and then the driving part 212 may be utilized to drive the plurality of connecting rods 213 to rotate. In this way, the second end of the connecting rod 213 may drive the guide rod 242 to slide along the radial direction of the center rod 230 in the guide portion 215, so as to enable the guide rod 242 to drive the corresponding fixed block 240 to slide on the guide plate 211.

In addition, in the embodiments of the present application, the fixed mechanism 200 further includes a plurality of retractable shock-absorbing rods 220, and the plurality of shock-absorbing rods 220 are respectively disposed in one-to-one correspondence with the plurality of connecting rods 213. A first end of the shock-absorbing rod 220 is rotatably connected to the corresponding connecting rod 213, and a second end of the shock-absorbing rod 220 is rotatably connected to the central rod 230. Therefore, when the connecting rod 213 rotates to drive the guide rod 242 to move, the length of the shock-absorbing rod 220 may be ensured to be changed in a small range, the possibility of vibration occurred during the radial movement of the plurality of fixed blocks 240 along the center rod 230 is reduced, or the vibration amplitude during the movement of the plurality of fixed blocks 240 is decreased.

Figure 8:
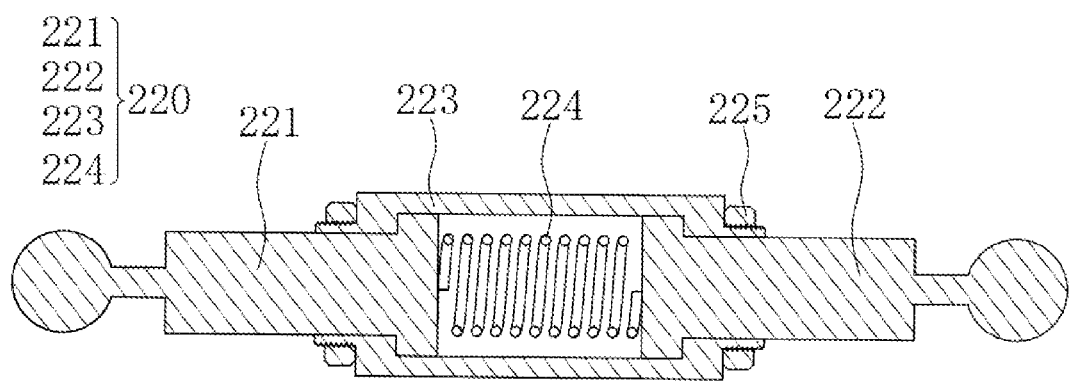
FIG. 8 is a structural schematic diagram intended to show a connector provided by an embodiment of the present application.
Figure 9:
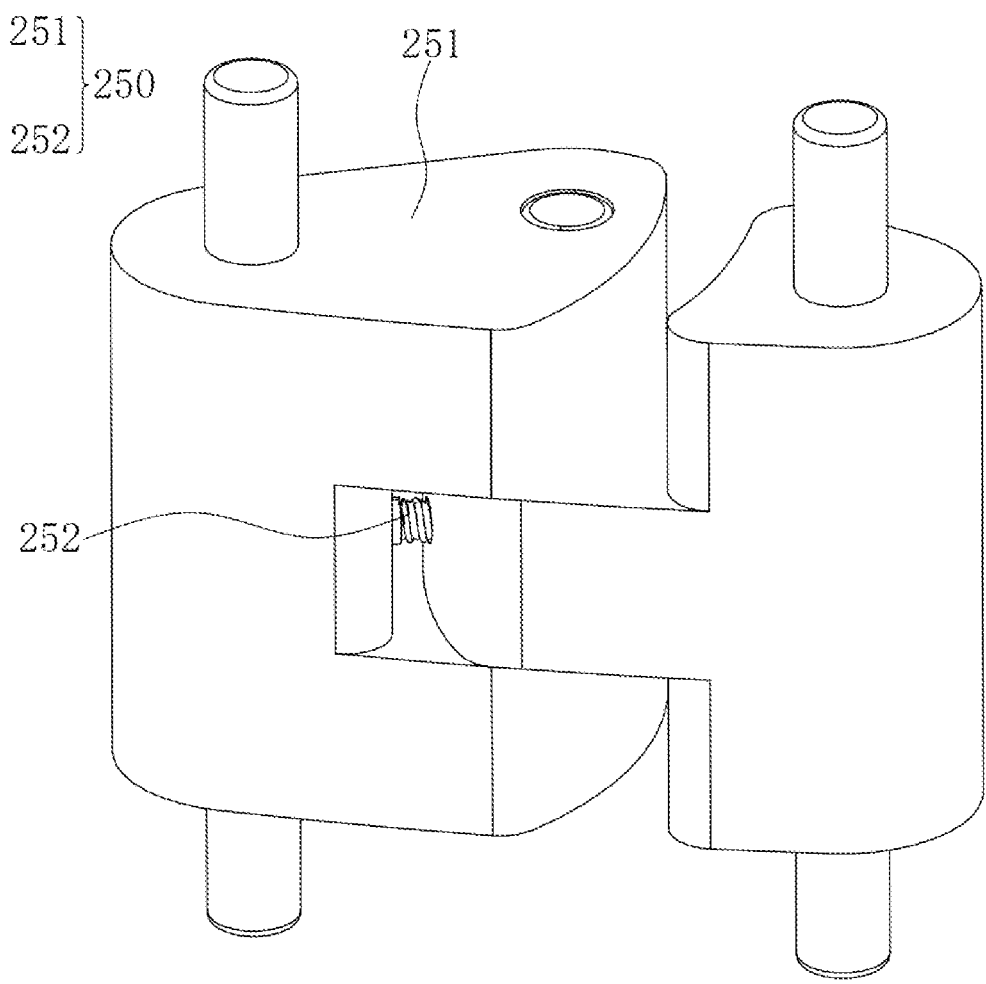
FIG. 9 is a structural schematic diagram intended to show a shock-absorbing rod provided by an embodiment of the present application.

Referring to FIG. 6 to FIG. 8, the shock-absorbing rod 220 may be implemented in various ways. In the embodiments of the present application, the shock-absorbing rod 220 includes a first inner rod 221, a second inner rod 222, a fixed sleeve 223 and a first elastic member 224. The first inner rod 221 and the second inner rod 222 are both threaded through the fixed sleeve 223, and both of them are slidable in the fixed sleeve 223 along a length direction of the fixed sleeve 223. The first inner rod 221 is configured to be connected with the connecting rod 213 and the second inner rod 222 is configured to be connected with the center rod 230. The first elastic member 224 is disposed between the first inner rod 221 and the second inner rod 222, and both ends of the first elastic member 224 are respectively connected to the first inner rod 224 and the second inner rod 222, so as to realize the extension and contraction process of the shock-absorbing rod 220 by means of the elasticity of the first elastic member 224.

Considering that the first inner rod 221 and the second inner rod 222 are required to slide in the fixed sleeve 223 for many times so as to realize the change of the length of the shock-absorbing rod 220, as a result, exemplarily, both ends of the fixed sleeve 223 are provided with sealing elements 225, so that the possibility of dust and other impurities entering the fixed sleeve 223 may be reduced by means of the sealing elements 225, thereby reducing the influence of dust and other impurities on the sliding process of the first inner rod 221 and the second inner rod 222. Furthermore, the sealing elements 225 may also play a certain role in fixing the fixed sleeve 223, so as to ensure the extension and contraction process of the shock-absorbing rod 220.

The fixed block 240 and the guide plate 211 will be described below with reference to FIG. 6 to FIG. 8. Exemplarily, each fixed block 240 is provided with a guide groove 241, and the guide plate 211 is correspondingly provided with a plurality of guide blocks 214. The plurality of guide blocks 214 are respectively disposed in one-to-one correspondence with a plurality of guide grooves 241, and the guide blocks 214 are disposed in the corresponding guide grooves 241. Therefore, the guide block 214 can be used to cooperate with the guide groove 241, thereby making the sliding process of the fixed block 240 more stable.

Alternatively, each fixed block 240 is provided with a guide block 214, and the guide plate 211 is provided with a plurality of guide grooves 241, and each guide groove 241 extends along the radial direction of the center rod 230, so that when the fixed block 240 slides on the guide plate 211, the guide block 214 provided on the fixed block 240 is slidable in the corresponding guide groove 241.

Referring to FIG. 6 to FIG. 9, in order to make the connection between adjacent fixed blocks 240 more stable, in the embodiments of the present application, a connecting assembly 250 is provided between the adjacent fixed blocks 240. The connecting assembly 250 includes two connecting blocks 251 and a second elastic member 252. The two connecting blocks 251 are respectively disposed in one-to-one correspondence with the two adjacent fixed blocks 240, and first ends of the connecting blocks 251 are rotatably connected to corresponding fixed blocks 240, and second ends of the two connecting blocks 251 are connected with each other rotatably. A first end of the second elastic member 252 is connected to one of the connecting blocks 251, and a second end of the second elastic member 252 is connected to the other connecting block 251.

By adopting the above technical solution, when the plurality of fixed blocks 240 slide on the guide plate 211 along the radial direction of the center rod 230, the distance between the adjacent fixed blocks 240 gradually increases or decreases, so that the two adjacent fixed blocks 240 drive the corresponding connecting blocks 251 to rotate respectively, and the two connecting blocks 251 rotate relative to each other, so that the two connecting blocks 251 may be used to fill between the adjacent fixed blocks 240. The second elastic member 252 may play a certain limiting role on relative positions of the two connecting blocks 251, ensuring that an arc transition may be formed at a joint between the two connecting blocks 251, avoiding the situations that the two connecting blocks 251 are stuck or difficult to return, and further making the connection between the adjacent fixed blocks 240 more stable.

Referring to FIG. 6 to FIG. 10, in order to make the rotation process of the center rod 230 more stable, exemplarily, a connector 160 is also provided on the housing 100. One end of the center rod 230 passes through the connector 160, and is configured to be rotatable around the axial direction of the center rod 230. Consequently, the connector 160 and the guide plate 211 may be used to play a centering role on the rotation process of the center rod 230, ensure that the center rod 230 may always rotate around the direction parallel to the axial direction of the central rod 230, and reduce the possibility of shaking of the center rod 230 occurred, thereby making the rotation process of the center rod 230 more stable.

Continuing with reference to FIG. 6 to FIG. 10, the specific structure of the connector 160 will be described below. The connector 160 includes a connecting disk 161 and a plurality of fixed rods 162, and the central rod 230 is disposed on the connecting disk 161 and passes through the connecting disk 161. All of the plurality of fixed rods 162 are disposed along the radial direction of the central rod 230, and are evenly disposed on the connecting disk 161 along the circumferential direction of the central rod 230. A first end of each fixed rod 162 is connected to the connecting disk 161, and a second end of each fixed rod 162 is fixed on the housing 100, so that the connecting disk 161 may be fixed on the housing 100 by the plurality of fixed rods 162. As for the specific connection relationship between the second end of the fixed rod 162 and the housing 100, exemplarily, the housing 100 is provided with an installation groove 121, and the second end of the fixed rod 162 is placed in the installation groove 121. An installation block 122 is further disposed in the installation groove 121, and the installation block 122 is contacted with the second end of the fixed rod 162 and is fixed in the installation groove 121 by a fastener such as a screw, so that the second end of the fixed rod 162 may be fixed on the housing 100.

Figure 10:
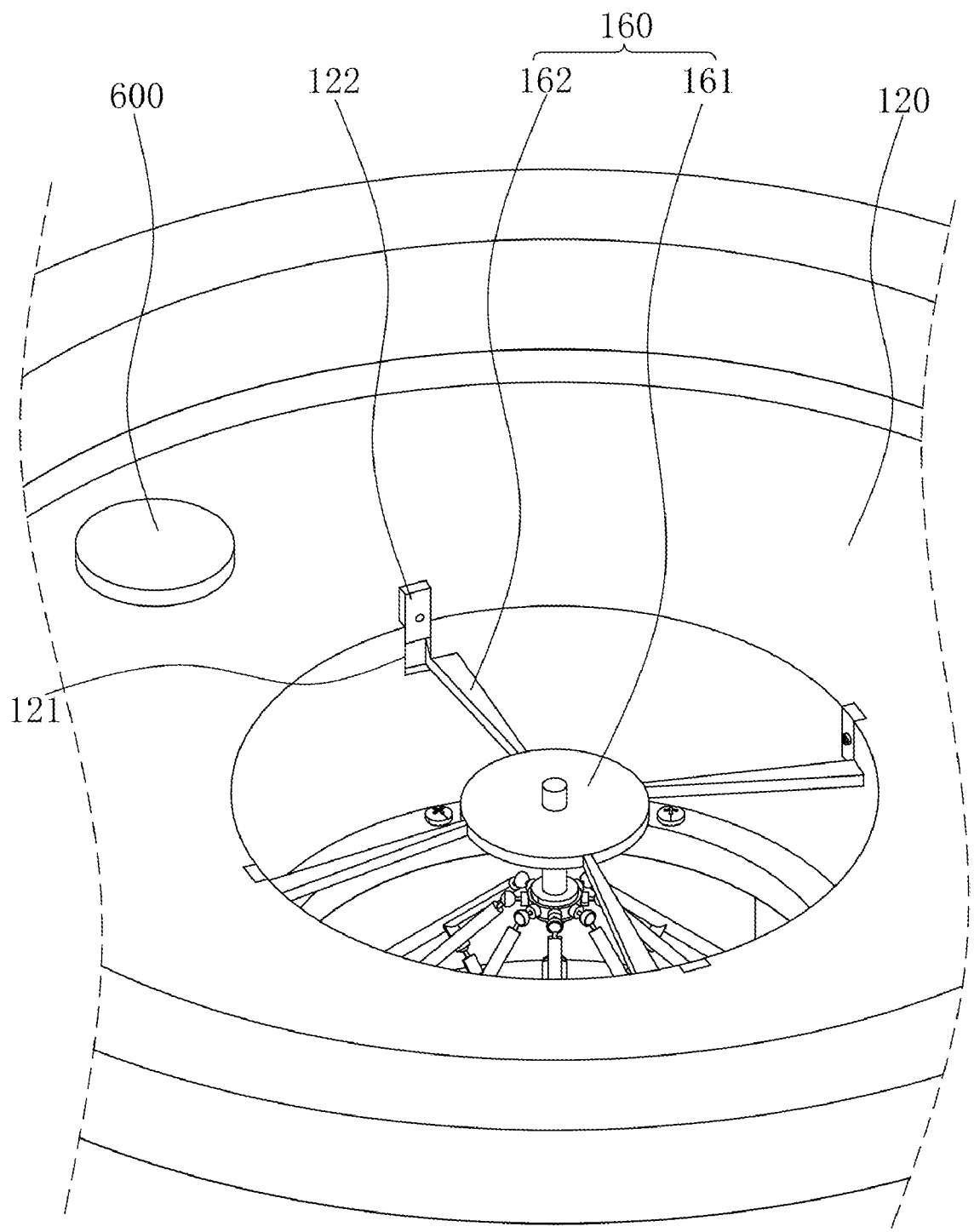
FIG. 10 is a structural schematic diagram intended to show a connecting assembly provided by an embodiment of the present application.

Furthermore, in order to make the connection between the fixed rod 162 and the housing 100 more stable, referring to FIG. 10, exemplarily, the second end of the fixed rod 162 is provided with a protruding part, and the protruding part has an inclined surface. The inclined surface is inclined toward a direction away from the guide plate in a direction toward the second end of the fixed rod 162. When the second end of the fixed rod 162 is installed in the installation groove 121, the fixed rod 162 can be stuck in the housing through the inclined surface on the protruding part, thereby making the installation of the fixed rod 162 more stable. The inclination angle of the inclined surface is not further limited in the embodiments of the present application, as long as the stability of the installation of the fixed rod 162 can be ensured.

The specific structure of the housing 100 will be described below with reference to FIG. 1 to FIG. 10. The housing 100 further includes a sealing cover 120, and the sealing cover 120 is disposed on and covers the plurality of fixed blocks 240 and is connected to the abutting part 130. In the embodiments of the present application, when the sealing ring 300 is disposed between the test cavity 170 and the detection cavity 180, the abutting part 130, the fixed block 240 and the sealing cover 120 all abut against the sealing ring 300, and the sealing cover 120, part of the abutting part 130, part of the fixed block 240 and part of the sealing ring 300 together form the detection cavity 180; and/or, the guide plate 211, part of the abutting part 130, part of the fixed block 240 and part of the sealing ring 300 together form the test cavity 170.

When the sealing ring 300 is installed in order to perform the sealing-performance test of the sealing ring 300, the sealing cover 120 is removed from the fixed block 240, and then the sealing ring 300 is placed between the abutting part 130 and the fixed block 240. And then, the sealing ring 300 is fixed by the fixed mechanism 200, so that an inner side of the sealing ring 300 can abut against the plurality of fixed blocks 240 and an outer side of the sealing ring 300 can be contacted with the abutting part 130, and the guide plate 211, part of the abutting part 130, part of the fixed block 240 and part of the sealing ring 300 can together form the test cavity 170. The sealing cover 120 is disposed on the plurality of fixed blocks 240 and covers them and abuts against the abutting part 130, so as to enable the sealing cover 120, part of the abutting part 130, part of the fixed block 240 and part of the sealing ring 300 to together form the detection cavity 180, thereby realizing the testing process of the sealing performance of the sealing ring 300.

Figure 2:
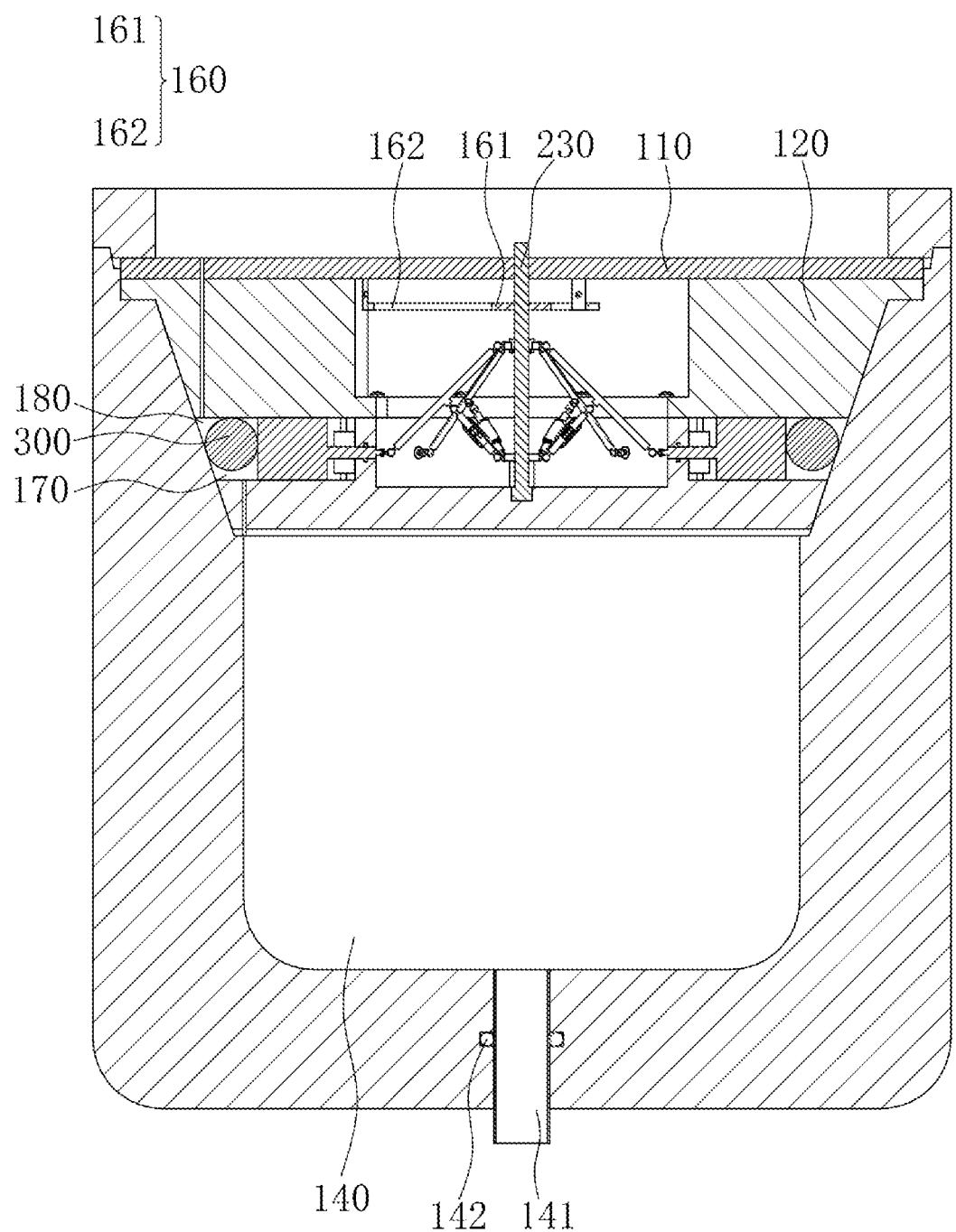
FIG. 2 is a sectional view of an equipment for sealing-performance test provided by an embodiment of the present application.
Figure 3:
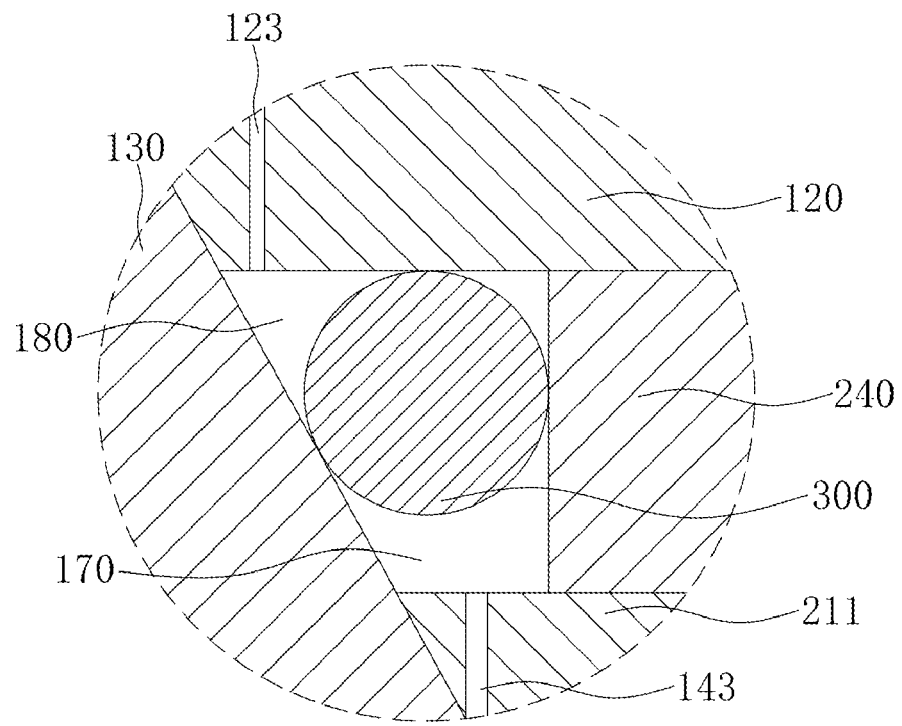
FIG. 3 is a schematic diagram of an installation structure of a sealing ring with a larger diameter provided by an embodiment of the present application.
Figure 4:
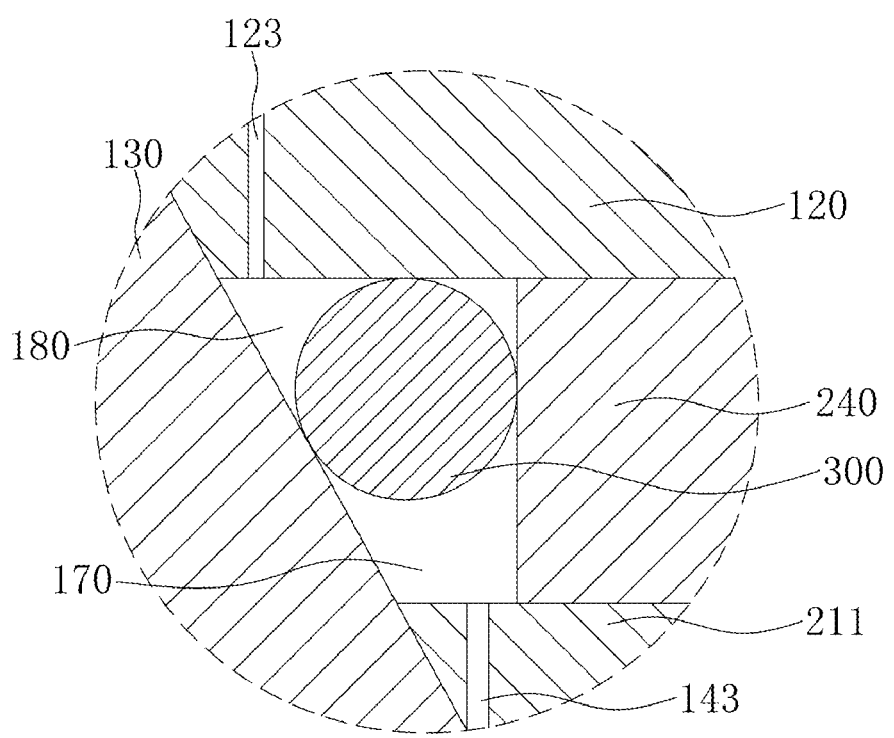
FIG. 4 is a schematic diagram of an installation structure of a sealing ring with a smaller diameter provided by an embodiment of the present application.

Referring to FIG. 2 to FIG. 4, in the embodiments of the present application, the sealing cover 120 is provided with a detection passage 123. A first end of the detection passage 123 is communicated with the detection cavity 180, so as to make a detection part 600 detect the test fluid through a second end of the detection passage 123, therefore, the detection part 600 can be installed outside the detection cavity 180, and it is more convenient for the installation process of the detection part 600. As for the detection part 600, it may be implemented in various ways. For example, in the embodiments of the present application, the detection part 600 may be selected to be a component capable of detecting a concentration of hydrogen.

Exemplarily, taking a plane perpendicular to the direction parallel to the axial direction of the central rod 230 as a cross section, a cross-sectional area of the abutting part 130 gradually increases along the direction parallel to the axial direction of the central rod 230, or the cross-sectional area of the abutting part 130 gradually decreases along the direction parallel to the axial direction of the central rod 230, so that outer sides of the sealing rings 300 with different outer diameters can all abut against the abutting part 130, thereby performing a test on the sealing rings 300 with different outer diameters. In the embodiments of the present application, taking a plane perpendicular to the direction parallel to the axial direction of the central rod 230 as a cross-section, the cross-sectional area of the abutting part 130 gradually decreases along a direction close to the sealing cover 120. That is, when the outer diameter of the sealing ring 300 increases, the outer side of the sealing ring 300 can be contacted with a side of the abutting part 130 away from the sealing cover 120; when the outer diameter of the sealing cover 120 decreases, the outer side of the sealing ring 300 can be contacted with a side of the abutting part 130 close to the sealing cover 120, thus, the formation of the test cavity 170 and the detection cavity 180 can be ensured.

Referring to FIG. 3 and FIG. 4, by using the above technical solution, when the sealing-performance test is performed on the sealing rings 300 with different outer diameters, the sealing ring 300 is placed between the abutting part 130 and the fixed block 240, and then the sealing ring 300 is fixed by means of the fixed mechanism 200, so that the inner side of the sealing ring 300 can abut against the plurality of fixed blocks 240, and the outer side of the sealing ring 300 can be contacted with the abutting part 130. When the outer diameter of the sealing ring 300 in this test is smaller than that in the previous test, the sealing ring 300 is moved toward a direction close to the guide plate 211, so that the outer side of the sealing ring 300 can be in contact with the abutting part 130. When the outer diameter of the sealing ring 300 in this test is larger than that in the previous test, the sealing ring 300 is moved toward a direction away from the guide plate 211, so that the outer side of the sealing ring 300 can be in contact with the abutting part 130.

Figure 5:
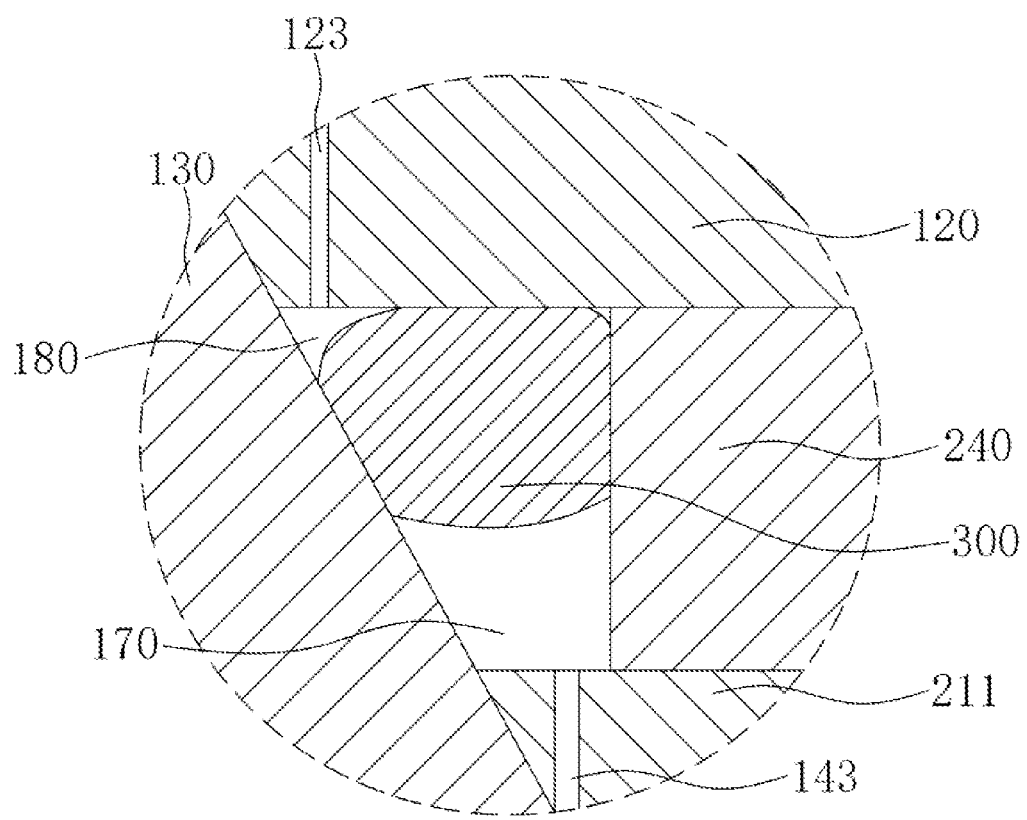
FIG. 5 is a schematic diagram of an installation structure of a compressed sealing ring provided by an embodiment of the present application.

Referring to FIG. 3 and FIG. 5, when it is necessary to test the sealing performance of the sealing ring 300 under different compression amounts or different cross-sectional areas, the sealing ring 300 is placed between the abutting part 130 and the fixed block 240, and then the center rod 230 is rotated, so that the central rod 230 can drive the plurality of fixed blocks 240 to move along a direction away from the central rod 230 through the driving assembly 210, thereby expanding the inner diameter of the sealing ring 300 and making the compression amount of the sealing ring 300 increase, that is, the cross-sectional area of the sealing ring 300 decreases, so that the sealing ring 300 moves towards the direction away from the guide plate 211. Moreover, the outer side of the sealing ring 300 can be always in contact with the abutting part 130, so that the sealing performance of the sealing ring 300 under different compression amounts or different cross-sectional areas can be tested.

And it should be noted that, exemplarily, the installation groove 121 may be provided on the sealing cover 120, so that the length of the fixed rod 162 can be reduced; and the housing 100 is further provided with a top cover 110, and the top cover 110 is provided on the opening, so as to close the housing 100. As for the specific installation of the top cover 110, exemplarily, the top cover 110 is detachably installed on the housing 100 and is removable from the opening. For example, the top cover 110 and the housing 100 are snap-fastened, or the top cover 110 is hinged on the housing 100, so as to be disposed on and cover the opening or be removed from the opening.

A process of filling the test cavity 170 with the test fluid will be described below with reference to FIG. 2 and FIG. 11. A high-pressure cavity 140 is further formed in the housing 100, and the high-pressure cavity 140 is communicated with the test cavity 170 to provide the test cavity 170 with the test fluid. It is easy to understand that the high-pressure cavity 140 may be formed in the housing 100 in various ways. For example, the high-pressure cavity 140 may be formed between a side of the guide plate 211 away from the sealing cover 120 and part of the housing 100; or, the high-pressure tank may be installed inside the housing 100, so as to form the high-pressure cavity 140 by means of an interior of the high-pressure tank, which is not further limited in the embodiments of the present application. Furthermore, the high-pressure cavity 140 may be communicated with the test cavity 170 in various ways, for example, the guide plate 211 may be provided with at least one through hole 143, or a flow channel pipeline may be arranged inside the guide plate 211 or the abutting part 130; or a certain gap is reserved between the guide plate 211 and the abutting part 130, so that the test fluid can flow from the high-pressure cavity 140 into the test cavity 170 through the gap, and the filling process of the test fluid can be realized through the flow channel pipeline.

Figure 11:
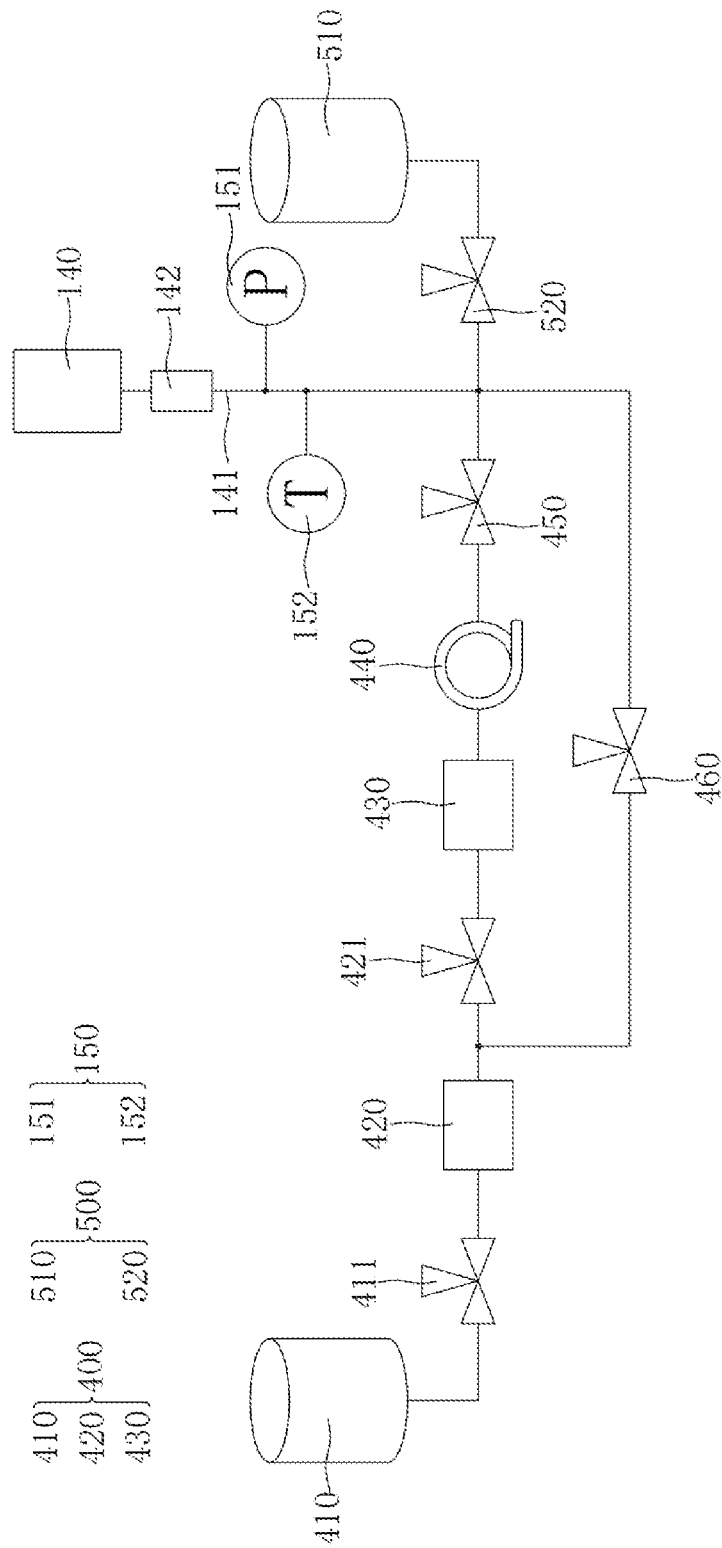
FIG. 11 is a structural schematic diagram of an intake passage and an exhaust passage provided by an embodiment of the present application.

Continuing with reference to FIG. 2 and FIG. 11, the housing 100 is also provided with a ventilation passage 141, and a first end of the ventilation passage 141 is communicated with the high-pressure cavity 140, and a second end of the ventilation passage 141 is connected to an intake passage 400. The intake passage 400 includes an air-source bin 410 and a control assembly. The air-source bin 410 is configured to provide the test fluid to the high-pressure cavity 140, and the control assembly is disposed between the air-source bin 410 and the ventilation passage 141, and is configured to adjust test parameters of the test fluid. The test parameters include a pressure of the test fluid and a temperature of the test fluid. Exemplarily, the control assembly includes a pressure-control device 420 and a temperature-control device 430, so that the pressure of the test fluid can be controlled using the pressure-control device 420 and the temperature of the test fluid can be controlled using the temperature-control device 430. Moreover, by creating different test conditions by means of adjustment of the pressure and temperature of the test fluid, the sealing-performance test of the sealing ring 300 can be performed under different temperature and pressure conditions. Referring to FIG. 11, it is specifically configured that an air outlet of the air-source bin 410 is communicated with an air inlet of the pressure-control device 420, an air outlet of the pressure-control device 420 is connected to an air inlet of the temperature-control device 430, and an air outlet of the temperature-control device 430 is connected to the second end of the ventilation passage 141. When the test fluid is provided into the high-pressure cavity 140 through the air inlet passage 400, the air outlet of the air-source bin 410 discharges a high-pressure test fluid, so that the test fluid can pass through the pressure-control device 420 and the temperature-control device 430 successively to enter the ventilation passage 141 and then enter the high-pressure cavity 140 through the ventilation passage 141.

Continuing with reference to FIG. 11, and exemplarily, in order to realize the control process of the flow of the test fluid, a master air intake valve 411 is provided between the air outlet of the air-source bin 410 and the air inlet of the pressure-control device 420, so that the test fluid discharged from the air-source bin 410 can be controlled by the master intake valve 411. Furthermore, a first intake valve 421 is disposed between the air outlet of the pressure-control device 420 and the air inlet of the temperature-control device 430, and a stabilization device 440 and a second intake valve 450 are further provided between the air outlet of the temperature-control device 430 and the second end of the ventilation passage 141, so that the stabilization device 440 can be used to make the test fluid flow stably and evenly in the intake passage 400.

However, in order to quickly deliver the test fluid at normal temperature and under high pressure to the ventilation passage 141, in the embodiment of the present application, the air outlet of the pressure-control device 420 is directly communicated with the second end of the ventilation passage 141, and a third intake valve 460 is also provided between the air outlet of the pressure-control device 420 and the second end of the ventilation passage 141, so that a third intake valve can be used to play a certain control role.

By adopting the above technical solution, when it is necessary to control the temperature and pressure of the test fluid, the main intake valve 411, the first intake valve 421 and the second intake valve 450 are opened, and the third intake valve 460 is closed, therefore, the fluid flowing out of the air outlet of the air-source bin 410 can pass through the pressure-control device 420 and the temperature-control device 430 in sequence, and can pass through the stabilization device 440, so as to flow stably and evenly to the ventilation passage 141, in which the temperature of the test fluid is not required to be controlled. When only the pressure of the test fluid is required to be controlled, the main intake valve 411 and the third intake valve 460 are opened, and the first intake valve 421 and the second intake valve 450 are closed, so that the fluid flowing out of the air outlet of the air-source bin 410 can enter the ventilation passage 141 through the pressure-control device 420 without passing through the temperature-control device 430.

It is easy to understand that, in the embodiments of the present application, all of the air-source bin 410, the pressure-control device 420, the temperature-control device 430 and the stabilization device 440 may be implemented in various ways, which are not further limited in the embodiments of the present application.

And/or, the second end of the ventilation passage 141 is connected with an exhaust passage 500, and the exhaust passage 500 includes a waste gas bin 510 and an exhaust valve 520. The waste gas bin 510 is configured to recover the test fluid in the high-pressure cavity 140, and the exhaust valve 520 is configured to control the on-off state between the waste gas bin 510 and the high-pressure cavity 140.

When the sealing-performance test of the sealing ring 300 is completed, the main intake valve 411, the first intake valve 421, the second intake valve 450 and the third intake valve 460 are closed, and the exhaust valve 520 is opened, so that the test fluid inside the high-pressure cavity 140 can flow into the waste gas bin 510 through the ventilation passage 141 and the exhaust passage 500 in sequence, so as to realize the recovery process of the test fluid.

Continuing with reference to FIG. 11, in the embodiments of the present application, a test assembly 150 is further provided on the ventilation passage 141, and the test assembly 150 includes at least one of a pressure-test piece 151 and a temperature-test piece 152. For example, the test assembly 150 includes both the pressure-test piece 151 and the temperature-test piece 152, and the pressure-test piece 151 is configured to detect the pressure of the test fluid, and the temperature-test piece 152 is configured to detect the temperature of the test fluid, so that the pressure and temperature of the test fluid in the test cavity 170 can be determined, and then with the cooperation of the detection part 600, the limit pressure and limit temperature that the sealing ring 300 can bear under the conditions of different cross-sectional areas and different compression amounts can be determined. It is easy to understand that the pressure-test piece 151 may be selected from components such as a pressure sensor, and the temperature-test piece 152 may be selected from components such as a temperature sensor.

In addition, the ventilation passage 141 is further provided with a control part 142, so that the control part 142 can be used to control the on-off of the ventilation passage 141, which ensures that during the test, the high-pressure cavity 140 will not be communicated with the intake passage 400 or the exhaust passage 500 through the ventilation passage 141.

As stated above, considering that the sealing ring 300 may be applied under different pressure conditions and different temperature conditions, taking the pressure of the test fluid being 30 MPa-160 MPa and the temperature of the test fluid being −50° C. to 160° C. as an example, a sealing-performance testing process provided by the embodiments of the present application is described below, so that the sealing performance of the sealing ring 300 can be tested in a relatively large pressure range and in a wide temperature range, which specifically includes the following steps.

First, the sealing ring 300 is installed on outer sides of the plurality of fixed blocks 240, and then the plurality of fixed blocks 240 are driven by the driving assembly 210 to move in the radial direction of the center rod 230, so that all of the plurality of fixed blocks 240 abut against the inner side of the sealing ring 300 and the abutting part 130 abuts against the outer side of the sealing ring 300. As a result, the test cavity 170 and the detection cavity 180 for filling test fluid can be formed in the housing 100. The sealing ring 300 is located between the test cavity 170 and the detection cavity 180, and separates the test cavity 170 from the detection cavity 180, so that the test fluid in the test cavity 170 will not flow into the detection cavity 180.

Subsequently, the main intake valve 411, the first intake valve 421 and the second intake valve 450 are opened, so as to enable the test fluid in the air-source bin 410 to flow in the intake passage 400, and the pressure of the test fluid is controlled by the pressure-control device 420 to be 30 MPa, and the temperature of the test fluid is controlled by the temperature-control device 430 to be −50° C., so that the test fluid can enter the high-pressure cavity 140 through the ventilation passage 141 and enter the test cavity 170 through the high-pressure cavity 140. And then, the test time is set. After the test time elapses, the concentration of the test fluid in the detection cavity 180 is detected using the detection part 600. If the detection part 600 detects the existence of the test fluid in the detection cavity 180, the sealing performance of the sealing ring 300 is poor; if the detection part 600 does not detect the existence of the test fluid in the detection cavity 180, the sealing performance of the sealing ring 300 is better.

After this test is completed, the main intake valve 411, the first intake valve 421, the second intake valve 450 and the third intake valve 460 are closed, and the exhaust valve 520 is opened, so that the test fluid in the high-pressure cavity 140 can flow into the waste gas bin 510 through the ventilation passage 141 and the exhaust passage 500 in sequence, thereby realizing the recovery process of the test fluid.

Subsequently, the test conditions are changed by changing the cross-sectional area and the compression amount of the sealing ring 300, or by changing the pressure and temperature of the test fluid; and the above steps are repeated, so as to obtain the influence of the cross-sectional area and the compression amount of the sealing ring 300 on the sealing performance, and the influence of the pressure and temperature of the test fluid on the sealing performance of the sealing ring 300.

Other embodiments of the present application will readily occur to those skilled in the art upon consideration of the specification and after practice of the disclosure disclosed herein. The present application is intended to encompass any variations, uses or adaptations of the present application, which follow the general principles of the present application and include common knowledge or conventional technical means in the technical field not disclosed in the present application. The specification and embodiments are to be regarded as exemplary only, the true scope and spirit of the present application being indicated by the following claims.

It is to be understood that the present application is not limited to the precise structures described above and illustrated in the accompanying drawings and that various modifications and changes may be made without departing from the scope thereof. The scope of the present application is limited only by the appended claims.

What is claimed is:

1. An equipment for sealing-performance test, comprising a housing, a fixed mechanism and a detection part, wherein
   the housing is configured to accommodate the fixed mechanism, and an abutting part is formed in the housing, and the abutting part is configured to abut against an outer side of a sealing ring;
   the fixed mechanism comprises a central rod, a plurality of fixed blocks and a driving assembly, and the central rod extends along a direction parallel to an axial direction of the central rod, and the plurality of fixed blocks are evenly disposed along a circumferential direction of the central rod; the driving assembly is configured to drive the plurality of fixed blocks to move along a radial direction of the central rod, so as to make each of the fixed blocks abut against an inner side of the sealing ring; and
   when the abutting part abuts against the outer side of the sealing ring and all of the plurality of fixed blocks abut against the inner side of the sealing ring, a test cavity and a detection cavity are formed in the housing, the test cavity and the detection cavity are disposed along the direction parallel to the axial direction of the central rod, the sealing ring is located between the test cavity and the detection cavity so as to separate the test cavity from the detection cavity, the test cavity is filled with a test fluid, and the detection part is configured to detect the test fluid in the detection cavity.

2. The equipment for sealing-performance test according to claim 1, wherein the driving assembly comprises a guide plate, a driving part and a plurality of connecting rods;
   the guide plate is disposed in the housing, and the guide plate is configured to be connected with the plurality of fixed blocks, so as to enable the plurality of fixed blocks to slide along the radial direction of the central rod;
   the driving part is sleeved on the central rod and is movable on the central rod along the direction parallel to the axial direction of the central rod;
   the plurality of connecting rods are disposed in one-to-one correspondence with the plurality of fixed blocks, and first ends of the connecting rods are rotatably connected to the driving part, and second ends of the connecting rods are rotatably connected to corresponding fixed blocks.

3. The equipment for sealing-performance test according to claim 2, wherein the driving assembly further comprises a rotating head, the rotating head is threadedly connected with the central rod, and the driving part is connected to the rotating head and is rotatable around the direction parallel to the axial direction of the central rod.

4. The equipment for sealing-performance test according to claim 3, wherein the fixed mechanism further comprises a plurality of retractable shock-absorbing rods, and the plurality of shock-absorbing rods are respectively disposed in one-to-one correspondence with the plurality of connecting rods, and first ends of the shock-absorbing rods are rotatably connected to corresponding connecting rods, and second ends of the shock-absorbing rods are rotatably connected to the center rod.

5. The equipment for sealing-performance test according to claim 4, wherein each of the shock-absorbing rods comprises a first inner rod, a second inner rod, a fixed sleeve and a first elastic member; the first inner rod and the second inner rods are each threaded through the fixed sleeve, and the first inner rod is configured to be connected with corresponding one of the connecting rods, and the second inner rod is configured to be connected with the central rod;

the first elastic member is disposed between the first inner rod and the second inner rod, and both ends of the first elastic member are respectively connected to the first inner rod and the second inner rod.

6. The equipment for sealing-performance test according to claim 2, wherein a guide portion is further provided on the guide plate; and each of the fixed blocks is provided with a guide rod, and the guide rod extends along the radial direction of the central rod, and the guide rod is threaded through the guide portion and is slidable along the radial direction of the center rod; a first end of the guide rod is connected to a fixed block, and a second end of the guide rod is connected to a second end of a connecting rod.

7. The equipment for sealing-performance test according to claim 6, wherein the fixed mechanism further comprises a plurality of retractable shock-absorbing rods, and the plurality of shock-absorbing rods are respectively disposed in one-to-one correspondence with the plurality of connecting rods, and first ends of the shock-absorbing rods are rotatably connected to corresponding connecting rods, and second ends of the shock-absorbing rods are rotatably connected to the center rod.

8. The equipment for sealing-performance test according to claim 7, wherein each of the shock-absorbing rods comprises a first inner rod, a second inner rod, a fixed sleeve and a first elastic member; the first inner rod and the second inner rods are each threaded through the fixed sleeve, and the first inner rod is configured to be connected with corresponding one of the connecting rods, and the second inner rod is configured to be connected with the central rod;

the first elastic member is disposed between the first inner rod and the second inner rod, and both ends of the first elastic member are respectively connected to the first inner rod and the second inner rod.

9. The equipment for sealing-performance test according to claim 2, wherein each of the fixed blocks is provided with a guide groove, and a plurality of guide blocks are correspondingly provided on the guide plate; and the plurality of guide blocks are respectively provided in one-to-one correspondence with a plurality of guide grooves, and the guide blocks are disposed in corresponding guide grooves.

10. The equipment for sealing-performance test according to claim 9, wherein the fixed mechanism further comprises a plurality of retractable shock-absorbing rods, and the plurality of shock-absorbing rods are respectively disposed in one-to-one correspondence with the plurality of connecting rods, and first ends of the shock-absorbing rods are rotatably connected to corresponding connecting rods, and second ends of the shock-absorbing rods are rotatably connected to the center rod.

11. The equipment for sealing-performance test according to claim 2, wherein the fixed mechanism further comprises a plurality of retractable shock-absorbing rods, and the plurality of shock-absorbing rods are respectively disposed in one-to-one correspondence with the plurality of connecting rods, and first ends of the shock-absorbing rods are rotatably connected to corresponding connecting rods, and second ends of the shock-absorbing rods are rotatably connected to the center rod.

12. The equipment for sealing-performance test according to claim 11, wherein each of the shock-absorbing rods comprises a first inner rod, a second inner rod, a fixed sleeve and a first elastic member; the first inner rod and the second inner rods are each threaded through the fixed sleeve, and the first inner rod is configured to be connected with corresponding one of the connecting rods, and the second inner rod is configured to be connected with the central rod;

the first elastic member is disposed between the first inner rod and the second inner rod, and both ends of the first elastic member are respectively connected to the first inner rod and the second inner rod.

13. The equipment for sealing-performance test according to claim 2, wherein the housing further comprises a sealing cover, and the sealing cover is provided on and covers the plurality of fixed blocks and is connected to the abutting part;

the sealing cover, part of the abutting part, part of each of the fixed blocks and part of the sealing ring together form the detection cavity; and/or, the guide plate, part of the abutting part, part of each of the fixed blocks and part of the sealing ring together form the test cavity.

14. The equipment for sealing-performance test according to claim 13, wherein the sealing cover is provided with a detection passage, and a first end of the detection passage is communicated with the detection cavity, so as to make the detection part detect the test fluid through a second end of the detection passage.

15. The equipment for sealing-performance test according to claim 1, wherein a connector is further provided on the housing, and one end of the central rod passes through the connector, and the connector is arranged to be rotatable around an axial direction of the center rod.

16. The equipment for sealing-performance test according to claim 1, wherein a connecting assembly is provided between adjacent fixed blocks, and the connecting assembly comprises two connecting blocks and a second elastic member;

the two connecting blocks are respectively disposed in one-to-one correspondence with the two adjacent fixed blocks, and first ends of the connecting blocks are rotatably connected to corresponding fixed blocks, and second ends of the two connecting blocks are rotatably connected with each other;

a first end of the second elastic member is connected to one of the connecting blocks, and a second end of the second elastic member is connected to the other connecting block.

17. The equipment for sealing-performance test according to claim 1, wherein taking a plane perpendicular to the direction parallel to the axial direction of the central rod as a cross section, and a cross-sectional area of the abutting part gradually increases along the direction parallel to the axial direction of the central rod, or the cross-sectional area of the abutting part gradually decreases along the direction parallel to the axial direction of the central rod.

18. The equipment for sealing-performance test according to claim 1, wherein a high-pressure cavity is further formed in the housing, and the high-pressure cavity is communicated with the test cavity so as to provide the test fluid into the test cavity.

19. The equipment for sealing-performance test according to claim 18, wherein a ventilation passage and/or an exhaust passage are provided outside the housing, and a first end of the ventilation passage is communicated with the high-pressure cavity, and a second end of the ventilation passage is connected with an intake passage;

the intake passage comprises an air-source bin and a control assembly, the air-source bin is configured to provide the test fluid to the high-pressure cavity, the control assembly is disposed between the air-source bin and the ventilation passage and is configured to adjust test parameters of the test fluid, and the test parameters comprise a pressure of the test fluid and a temperature of the test fluid;

the exhaust passage comprises a waste gas bin and an exhaust valve, the waste gas bin is configured to recover the test fluid in the high-pressure cavity, and the exhaust valve is configured to control an on-off state between the waste gas bin and the high-pressure cavity.

20. The equipment for sealing-performance test according to claim 19, wherein a test assembly is provided on the ventilation passage, and the test assembly comprises at least one of a pressure-test piece and a temperature-test piece; and the pressure-test piece is configured to detect the pressure of the test fluid, and the temperature-test piece is configured to detect the temperature of the test fluid.

* * * * *